United States Patent
Duvvuri et al.

(10) Patent No.: US 11,449,773 B2
(45) Date of Patent: Sep. 20, 2022

(54) ENHANCED SIMILARITY DETECTION BETWEEN DATA SETS WITH UNKNOWN PRIOR FEATURES USING MACHINE-LEARNING

(71) Applicant: Oracle International Corporation, Redwood Shores, CA (US)

(72) Inventors: Venkata Chandrashekar Duvvuri, Los Gatos, CA (US); Samba Reyes Njie, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 477 days.

(21) Appl. No.: 16/694,357

(22) Filed: Nov. 25, 2019

(65) Prior Publication Data
US 2021/0158182 A1 May 27, 2021

(51) Int. Cl.
*G06F 16/20* (2019.01)
*G06N 5/04* (2006.01)
*G06N 20/00* (2019.01)
*G06F 16/25* (2019.01)
*G06F 16/28* (2019.01)

(52) U.S. Cl.
CPC .............. *G06N 5/04* (2013.01); *G06F 16/258* (2019.01); *G06F 16/285* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 8,655,695 B1 | 2/2014 | Qu et al. | |
| 9,087,332 B2 | 7/2015 | Bagherjeiran et al. | |
| 10,147,041 B2 | 12/2018 | Gao et al. | |
| 11,270,185 B1* | 3/2022 | Ouyang | G06F 16/35 |
| 2011/0154216 A1* | 6/2011 | Aritsuka | G06F 9/44505 |
| | | | 715/745 |
| 2014/0006166 A1 | 1/2014 | Chiang et al. | |
| 2017/0046510 A1* | 2/2017 | Chen | G06F 21/552 |
| 2017/0140283 A1 | 5/2017 | Cheng et al. | |
| 2017/0330239 A1 | 11/2017 | Luo et al. | |
| 2019/0325348 A1* | 10/2019 | Carranza | G06K 9/6253 |

OTHER PUBLICATIONS

"Look-alike Modeling", Available online at: https://www.onaudience.com/resources/look-alike-modeling-reach-out-to-new-customers/, Access from internet on Apr. 1, 2019, pp. 1-4.
Peakall; Blaine, "How to Find New Customers Using AI and Machine Learning", Peak Demand, Available online at: https://www.peakdemand.co.uk/blog/find-new-customers-using-ai-and-machine-learning/, Apr. 8, 2018, pp. 1-4.

(Continued)

*Primary Examiner* — Jau Shya Meng
(74) *Attorney, Agent, or Firm* — Kilpatrick Townsend & Stockton LLP

(57) ABSTRACT

The present disclosure relates to systems and methods for using machine-learning techniques to detect similar features between data sets. More particularly, the present disclosure relates to systems and methods that learn feature patterns within at least two data sets using machine-learning techniques to determine similarities between clusters of users in a scalable and computationally efficient manner.

20 Claims, 8 Drawing Sheets

(56) References Cited

OTHER PUBLICATIONS

Sandy; Jeffri, "Investigating Starbucks Customers Segmentation Using Unsupervised Machine Learning", Available online at: https://medium.com/@jeffrisandy/investigating-starbucks-customers-segmentation-using-unsupervised-machine-learning-10b2ac0cfd3b, Access from internet on Apr. 2, 2019, pp. 1-28.

Zhang et al., "Implicit Look-Alike Modelling in Display Ads", Springer International Publishing, Available online at: http://www0.cs.ucl.ac.uk/staff/Weinan.Zhang/rtb-papers/cf-ctr.pdf, 2016, pp. 589-601.

* cited by examiner

ENHANCED SIMILARITY DETECTION BETWEEN DATA SETS WITH UNKNOWN PRIOR FEATURES USING MACHINE-LEARNING

TECHNICAL FIELD

The present disclosure relates to systems and methods for using machine-learning techniques to detect similar features between data sets. More particularly, the present disclosure relates to systems and methods that learn feature patterns within at least two data sets using machine-learning techniques to determine similarities between clusters of users in a scalable and computationally efficient manner.

BACKGROUND

Data management platforms can be used to process user data collected during interactions between user devices and web servers. User data can include user profiles that store a complex variety of detectable features that can characterize each user or user device. The large scale and complexity of detectable features make it difficult for data management platforms to identify similarities between at least two user profiles included in different collected data sets. Existing solutions model similarity on a user profile-to-user profile basis using a known set of user features. Given the complexity of user profiles, user-to-user similarity modeling is computationally expensive.

SUMMARY

Certain aspects and features of the present disclosure relate to systems and methods for executing machine-learning models to automatically detect similar data records between at least two data sets in a computationally efficient manner. A data set may include a plurality of data records. For example, a data record may represent a user profile that includes one or more data fields. Each data field may store a value representing a characteristic or feature of a user associated with the user profile. The value may be generated based on an interaction between a user device and a webpage or native application running on the user device.

A client may generate a data set of user profiles associated with a target outcome. For example, a target outcome may be a target action performed by a user device navigating a webpage or native application, such as selecting a displayed content item, selecting a link, or navigating to a particular network location. A group of user profiles representing the users who performed the target action may be collected in a first data set (e.g., a seed list of user profiles). The client may seek to identify which user profiles included in a second data set (e.g., a candidate list of user profiles) are similar to the user profiles included in the first data set. The second data set may include a collection of different user profiles (e.g., user profiles that the client has not yet engaged, and thus, have not yet performed the target action).

Certain embodiments of the present disclosure include a cloud-based application configured to process each of the first data set and the second data set to detect user profiles that are similar between the two data sets. To illustrate and only as a non-limiting example, the first data set may include user profiles for webpage visitors who selected a particular link on a particular webpage. The second data set may include a group of different user profiles, for example, user profiles with which the client has not yet interacted, user profiles with which the client has previously interacted, and so on. The user profiles included in the second data set may not have selected the particular link or may not include data indicating whether the particular link was selected. The client may transmit each of the first data set and the second data set to the cloud-based application for processing. The cloud-based application may execute one or more machine-learning techniques to detect which user profiles of the second data set are similar to at least one user profile of the first data set. In response, the cloud-based application may transmit to the client a new data set of one or more user profiles from the second data set. The user profiles included in the new data set may be determined by the cloud-based application as being similar to the user profiles of the first data set. The client may then transmit digital communications to webpage visitors or native application users based on the list of user profiles included in the new data set received from the cloud-based application. In certain embodiments, unsupervised machine-learning techniques may be executed to automatically identify user features from the user profiles that are predicted to have contributed to (e.g., are correlated with) the target outcome.

In some implementations, the cloud-based application may execute one or more machine-learning techniques to automatically detect similar user profiles between two data sets. As a non-limiting example, the cloud-based application may execute a predictive feature selection technique, such as a random forest algorithm or a variable importance algorithm, to predict which user features of the user profiles of the first data set contributed to the target outcome (e.g., selecting a particular link). The cloud-based application may then perform an unsupervised machine-learning-based clustering operation (e.g., k-means clustering or hashing) that clusters the user profiles of the second data set based on the user features identified by the predictive feature selection technique. For the first data set and for each cluster of the second data set, the user features may be transformed (e.g., into numerical values) and aggregated into a vector that represents the cluster of user profiles. The vector of each cluster of the second data set may be compared with the vector representing the first data set to determine, at a cluster-level, which cluster is most similar to the user profiles included in the first data set. For example, similarity may be determined based on a Euclidian or cosine distance between vectors. In some cases, the most similar cluster is then provided back to the client, so that the client can transmit communications to webpage visitors based on the user profiles that are most similar to the first data set of user profiles.

The large scale of data sets of user profiles (e.g., a data set of 20 million user profiles) and the complexity of the user features included in the user profiles (e.g., potentially tens of thousands of user features included in a single user profile) create a technical challenge in user similarity modeling. Additionally, the cloud-based application can receive multiple data sets from multiple clients seeking the user similarity modeling performable by the cloud-based application. The data sets received from different clients may be configured with different feature sets. Thus, a significant technical challenge is introduced because the cloud-based application performing the user similarity modeling for multiple clients does not receive or store the configuration of the user feature set of the data sets in advance of receiving the data sets from the client. As a technical advantage of these embodiments, the cloud-based application can perform this functionality without information in advance indicating which user features are captured in the data sets. Additionally, as a technical advantage, the cloud-based application may perform the above-described functionality using a cluster-level vector-based similarity determination. User similarity is determined on a cluster level, instead of a user-to-user level, and thus, the implementations described herein enhance the computational efficiency of detecting similar user profiles.

In some implementations, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method including: receiving a communication corresponding to a request for additional user profiles; in response to receiving the communication, accessing a user data set representing a plurality of user profiles, each user profile of the plurality of user profiles including a set of features characterizing a user associated with the user profile. The computer-implemented method also includes accessing a target data set including one or more target user profiles, each target user profile of the one or more target users profile having been previously identified by a client system as a target for engagement, and each target user profile of the one or more target user profiles being characterized by the set of features. The computer-implemented method also includes inputting each of the target data set and the user data set into a feature selection model, the feature selection model having been trained to select a subset of the set of features that are predictive of resulting in a target outcome. The computer-implemented method also includes performing a clustering operation on the user data set, the clustering operation causing one or more clusters of user profiles to be formed from the plurality of user profiles, and each cluster of the one or more clusters including two or more user profiles that share one or more features in common from the subset of features identified using the feature selection model. The computer-implemented method also includes generating, for each cluster of the one or more clusters, a cluster vector representing the one or more user profiles included in the cluster. The computer-implemented method also includes generating a target vector representing the one or more target user profiles included in the target data set. The computer-implemented method also includes determining a vector-to-vector similarity between the target vector and each cluster vector of the one or more cluster vectors. The computer-implemented method also includes selecting a cluster vector from the one or more cluster vectors, the selection being based at least in part on the vector-to-vector similarity between the target vector and the selected cluster vector. The computer-implemented method also includes in response to selecting the cluster vector, generating a response to the communication including each user profile of the one or more user profiles included in the selected cluster, the response indicating that the one or more user profiles included in the selected cluster are similar to the one or more target user profiles. Other embodiments of this aspect include corresponding computer systems, apparatus, and computer programs recorded on one or more computer storage devices, each configured to perform the actions of the methods.

Implementations may include one or more of the following features. The computer-implemented method further including: preprocessing the user data set by filtering the set of features, the filtering including removing a feature from the set of features when the feature is associated with a plurality of values across multiple user profiles, and where a variance of the plurality of values is greater than or equal to a threshold. The computer-implemented method further including: preprocessing the user data set by filtering the set of features, the filtering including removing a feature from the set of features when the feature is associated with a plurality of values across multiple user profiles, and where a variance of the plurality of values is less than a threshold. The computer-implemented method where the feature selection model uses one or more unsupervised machine-learning techniques to identify the subset of features from the set of features, the set of features being unknown prior to accessing the user data set. The computer-implemented method further including: transforming the user data set into numerical form using one or more feature decomposition techniques, where the transformed user data set includes an n-dimensional matrix representing each user of the plurality of users, each data element of the n-dimensional matrix corresponding to a feature of the set of features. The computer-implemented method where determining the vector-to-vector similarity between the target vector and each cluster vector of the one or more cluster vectors includes determining a similarity measure between the target vector and each cluster vector. The computer-implemented method where the communication further includes a requested number of user profiles that are determined to be similar to the one or more target user profiles, and where when the requested number of user profiles is larger than a number of user profiles included in the selected cluster, a user profile from another cluster is selected for inclusion in the response to the request for additional user profiles. Implementations of the described techniques may include hardware, a method or process, or computer software on a computer-accessible medium.

BRIEF DESCRIPTION OF THE DRAWINGS

The specification makes reference to the following appended figures, in which use of like reference numerals in different figures is intended to illustrate like or analogous components.

DETAILED DESCRIPTION

Data management platforms are configured to enable users to perform certain functionality on data records. For example, a data record may be a user profile that includes one or more data fields. The one or more data fields may include values that characterize a user associated with the user profile, and that were generated based on a previous interaction, such as between the user and a webpage. The scale of user profiles managed by data management platforms has increased to big-data levels (e.g., 20 million or more user profiles may be processed for a given processing task). Further, the complexity of each individual user profile has also increased. For example, a given user profile may include tens of thousands of data fields representing the various features or characteristics of the user profile.

Certain implementations of the present disclosure include a cloud-based application configured to perform an automated task using at least two data sets of user profiles; a first data set of user profiles (e.g., seed user profiles associated with performing a target action) and a second data set of user profiles (e.g., candidate user profiles). The automated task may include executing one or more machine-learning techniques to detect which user profiles of the second data set are similar to the user profiles of the first data set. The cloud-based application may perform the automated task in a computationally efficient manner by clustering user profiles based on certain user features selected using a predictive feature selection technique and evaluating similarity between groups of user profiles on a vector-to-vector basis (e.g., cluster vector compared with the vector representing the first data set), instead of a user-to-user basis.

Figure 1:
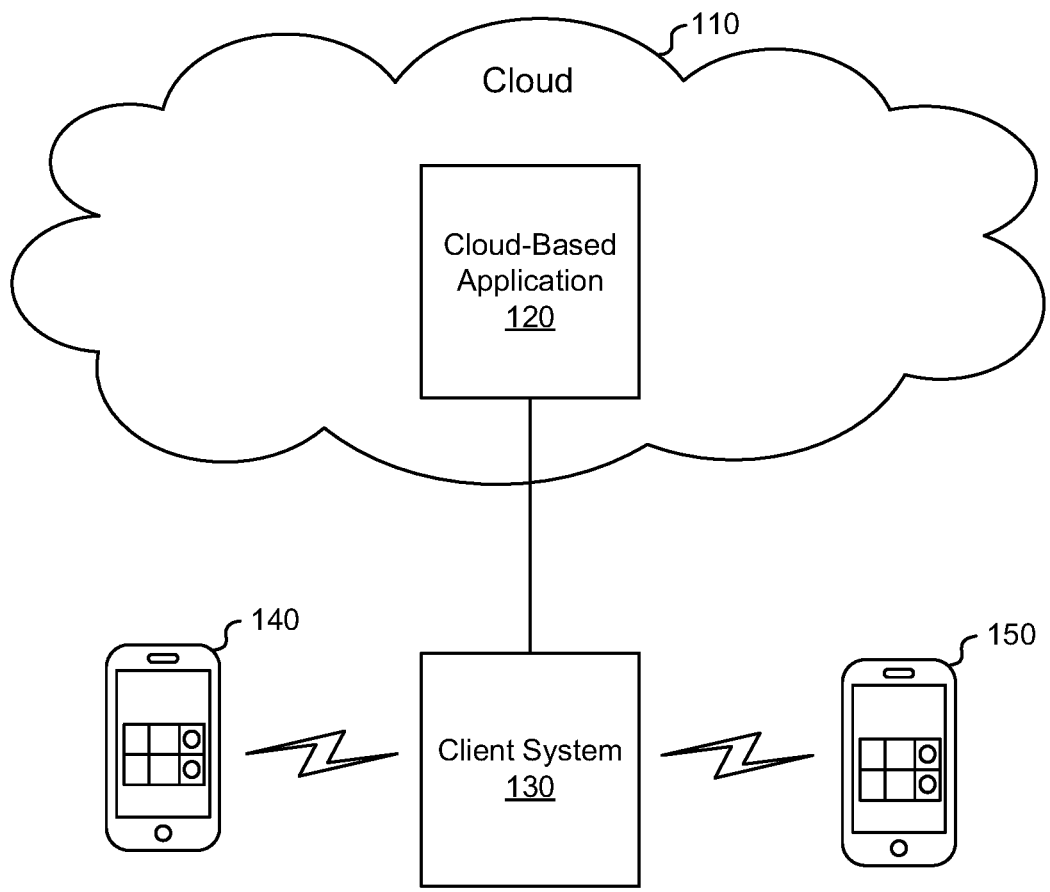
FIG. 1 is a block diagram illustrating an example of a network environment, according to some aspects of the present disclosure.

FIG. 1 is a block diagram illustrating an example of a network environment for processing data records using a data management platform, such as cloud-based application 120. Cloud network 110 may be any cloud-based network that includes one or more cloud-based servers and one or more cloud-based databases. The one or more cloud-based servers of cloud network 110 may include at least one application server that hosts cloud-based application 120, along with at least one database server. For example, cloud-based application 120 may be a data management platform configured to perform functionality associated with one or more data sets of data records. In some implementations, a data record may represent a user profile that includes one or more data fields. Each data field of the one or more data fields may include a value that was generated in response to a user device interacting with a native application or web server during a previous interaction. For example, when a user device accesses a web server to load a webpage on the user device, the web server may extract one or more user features (e.g., location of the originating request to load the webpage) associated with the request from the user device to load the webpage. Various user features may be collected over time in a user profile.

The client system 130 may include a network of one or more servers and databases associated with a client (e.g., an entity, such as a company). In some implementations, the network within the client system 130 may include a web server that hosts one or more webpages operated by or associated with the client. User device 140 may interact with the client system 130 by transmitting a communication to the web server of client system 130. The communication may be a request to load a webpage onto a browser running on the user device 140. Similarly, user device 150 may transmit a communication to the client system 130 requesting to load the webpage on the browser of user device 150.

It will be appreciated that any number of user devices and of any type of computing device (e.g., desktop computer, tablet computer, electronic kiosk, and so on) may communicate with client system 130.

In some implementations, client system 130 may generate one or more data sets of user profiles based on the interactions between the web server and the various user devices, such as user device 140 and user device 150. The user profiles may include data fields of feature values that are generated based on the user interactions (e.g., interactions by webpage visitors). Non-limiting examples of feature values may include IP address, location of user device, device type, browser type, user name (if detectable or known), actions performed, and other suitable features. To illustrate, one of the feature values may be represented by a data field associated with values that indicate whether the user selected a particular link. If, for example, the user operating user device 140 selected the particular link displayed on a webpage while the user was navigating the webpage, then a particular value may be stored at the data field included in the user profile. The value may indicate that the user selected the particular link, which may be a target outcome. The client system 130 may evaluate the user profiles (e.g., the first-party data collected by the client) to extract the user profiles that include the value indicating that the target outcome was achieved (e.g., the user selected the particular link). The client system 130 may store as a first data set (e.g., a seed list of user profiles) the extracted user profiles that are associated with having completed or achieved the target outcome. Further, the client system 130 may also store other user profiles in a second data set (e.g., a candidate list of user profiles). The second data set may include any number of other user profiles (e.g., not included in the first data set), such as user profiles associated with users who did not perform the target outcome, new user profiles for which there is a lack of data, user profiles associated with users who are anonymous, and other suitable user profiles. The second data set may include user profiles that the client seeks to engage. The client, however, may increase an efficiency and/or success of user communication by transmitting engagement communications to user devices based on user profiles of the second data set that are similar to user profiles of the first data set, which performed the target outcome.

The client system 130 may transmit the first data set and the second data set to the cloud-based application 120 to perform one or more analytical functions using the user profiles included in the first and second data sets. In some implementations, the cloud-based application 120 may perform a function that automatically detects which user profiles of the second data set are similar to one or more user profiles of the first data set. For example, performing the function may include executing a predictive feature selection technique that automatically identifies one or more data fields of the user profiles of the first data set that are predicted to have contributed to the performance of the target outcome. Non-limiting examples of the predictive feature selection technique may include a random forest algorithm, a variable importance algorithm, and other suitable feature selection techniques. The result of performing the predictive feature selection technique may include one or more data fields (e.g., user features) of data records (e.g., user profiles) that contributed to a user's performance of the target outcome. The cloud-based application 120 may execute an unsupervised machine-learning-based clustering algorithm, such as, for example, k-means clustering, exclusive clustering, overlapping clustering, hierarchical clustering, and probabilistic clustering. The clustering operation may be based at least in part on the user features identified as a result of performing the predictive feature selection techniques. As an illustrative example, if the predictive feature selection technique identified two user features (e.g., geographical location and device type) that correlated with users performing the target outcome, then the clustering operation may be performed on the user profiles of the second data set based on the two user features. Further, the cloud-based application 120 may standardize (e.g., transform) the user features of a user profile into an N-dimensional feature representation of the user profile using, for example, one or more feature decomposition techniques, such as singular value decomposition (SVD) and non-negative matrix factorization (NMF). The clustering operation may form one or more clusters of user profiles. For each cluster of the second data set and for the standardized user profiles of the first data set, the cloud-based application may aggregate the N-dimensional feature representations for the user profiles into a single vector that represents the user profiles of a cluster. Thus, for example, each cluster of the one or more clusters may be represented by a vector, and similarly, the first data set may be represented by a vector. The cloud-based application 120 may compare the vectors of each cluster of the second data set with the vector representing the first data set. For example, the vector-to-vector comparison may be based on a Euclidean or cosine distance and a threshold distance. As an illustrative and non-limiting example, if the vector representing a cluster of the second data set is within a threshold distance of the vector representing the first data set, then the cloud-based application 120 may determine that the user profiles included in the cluster of the second data set are similar to the user profiles of the first data set.

Figure 2:
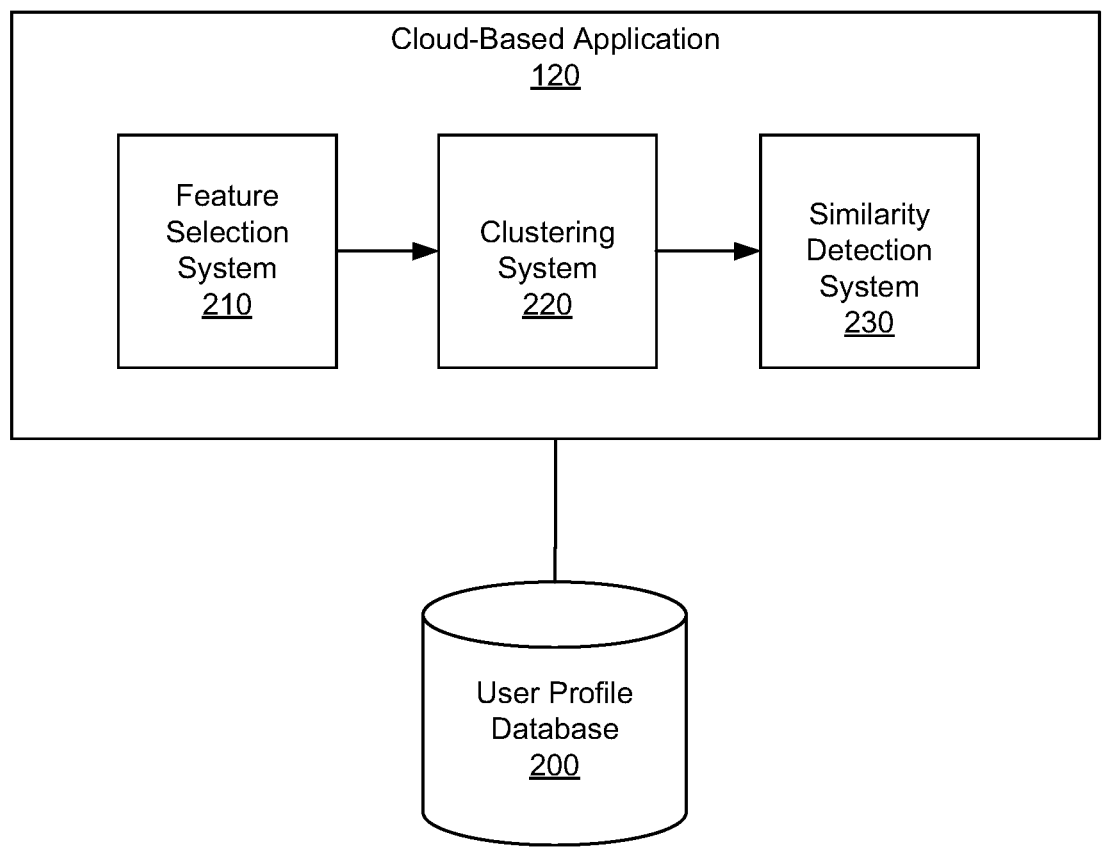
FIG. 2 is a block diagram illustrating another example of a network environment, according to some aspects of the present disclosure.

FIG. 2 is a block diagram illustrating an example of a network environment 110 for determining similar data records between two data sets, according to some aspects. The cloud-based application 120 may be a network of cloud-based servers and databases. In some implementations, the network of cloud-based application 120 may include feature selection system 210, clustering system 220, and similarity detection system 230. Further, in some implementations, the cloud-based application 120 may be configured to communicate with user profile database 200 to retrieve one or more user profile data sets. The user profile database 200 may be configured to store any number of data records, including one or more data sets of user profiles. For example, when the cloud-based application 120 receives the first and second data sets from the client system 130, as described in FIG. 1, the first and second data sets may be stored in the user profile database 200.

Feature selection system 210 may be any server or processor configured to perform a predictive feature selection technique to identify a subset of user features of the set of user features included in the user profiles. In some implementations, the user features included in the subset of user features may be determined by the feature selection system 210 as being predicted to contribute to the target outcome being performed. In other words, if the predictive feature selection technique selects a user feature from the set of user features included in the user profiles of the first data set, then the feature selection system 210 deems the user feature as "important" for achieving the target outcome. Non-limiting examples of a predictive feature selection technique include a random forest algorithm and a variable importance algorithm. In some implementations, the feature selection system 210 may also perform a feature standardization technique that results in an N-dimensional feature representation for each user profile. For example, the feature selection system 210 may standardize (e.g., transform) the user features of a user profile into an N-dimensional feature representation of the user profile using, for example, one or more feature decomposition techniques, such as singular value decomposition (SVD) and non-negative matrix factorization (NMF).

Clustering system 220 may be any server or processor configured to perform a clustering operation on the second data set using the subset of user features identified by the feature selection system 210. In some implementations, the clustering operation may be an unsupervised clustering operation, such as, for example, k-means clustering, exclusive clustering, overlapping clustering, hierarchical clustering, and probabilistic clustering. The clustering system 220 may perform clustering on the user profiles of the second data set. The clustering may also be performed based on the data fields of the user profiles in the second data set. The clustering operation may yield one or more clusters of user profiles of the second data set. In some implementations, the clustering system 220 may not perform clustering on the user profiles of the first data set, and in other implementations, the clustering system 220 may also cluster the user profiles of the first data set. The cloud-based application 120 automatically detects similar user profiles between two data sets without having the specific set of user features in advance of receiving the first and second data sets. As a technical advantage, the cloud-based application 120 may nonetheless perform the user similarity determination in a computationally efficient manner by executing unsupervised machine-learning techniques, such as the predictive feature selection and the clustering operations.

The similarity detection system 230 may be any server or processor configured to determine which cluster of user profiles of the second data set are similar to the user profiles of the first data set. In some implementations, the similarity detection system 230 may generate a one or more vectors for the first data set and for each cluster of the one or more clusters of the second data set. The vector may be determined by aggregating the N-dimensional feature representation of the user profiles included in each cluster of user profiles. As an illustrative and non-limiting example, each user profile in a cluster may be represented by three feature values after the feature standardization performed by the feature selection system 210. The similarity detection system 230 may compute an average (or any other combination) of the three feature values across the user profiles in the cluster to generate the vector that represents the cluster. The similarity detection system 230 may then compare the vector of each cluster to the vector representing the first data set against a threshold. In some implementations, the comparison may be performed in a Euclidean or cosine space, and the distance between the vector representing the cluster and the vector representing the first data set may be computed. If the distance is within the threshold value, then the similarity detection system 230 may determine that the user profiles included in the cluster are similar to the user profiles included in the first data set. As an advantage, the comparison performed by the similarity detection system 230 increases the computational efficiency of the cloud-based application 120 because the user similarity is determined on a group level, instead of on a user-to-user level.

Figure 3:
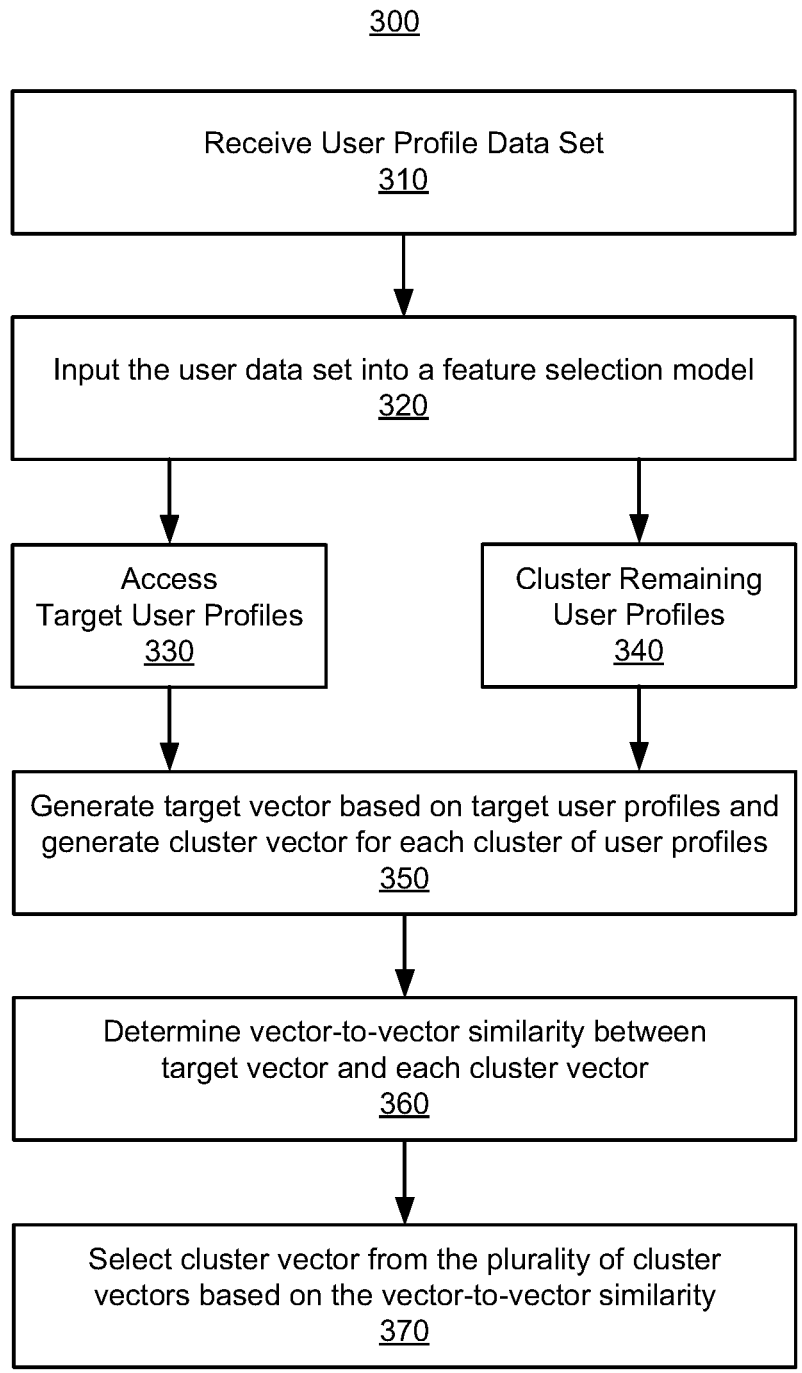
FIG. 3 is a flowchart illustrating an example of a process for determining similar user profiles across multiple data sets, according to some aspects of the present disclosure.

FIG. 3 is a flowchart illustrating an example of a process 300 for determining similar user profiles across multiple data sets, according to some aspects of the present disclosure. Process 300 may be performed at least in part by any of the components described in the Figures herein, for example, by any component of cloud-based application 120. Further, process 300 may be performed by the cloud-based application 120 to automatically detect similar user profiles between at least two data sets in a computationally efficient manner.

Process 300 may begin at block 310 where the cloud-based application 120 receives a first data set and a second data set from the client system 130. The first data set may include user profiles that include a feature value indicating that the user profiles are associated with one or more target outcomes. For example, the target outcome may be selecting a particular link displayed on a webpage managed by or associated with the client. If a user profile includes a tag or a data field indicating that the user associated with the user profile selected the particular link when the user navigated the webpage, then the user profile may be stored or included in the first data set. The client may also have collected or generated a second data set of user profiles that correspond to users who may not have performed the target outcome yet. In some cases, the user profiles of the second data set may represents users who have not yet had the chance to perform the target outcome. The client may transmit the first data set and the second data set to the cloud-based application 120 for the cloud-based application 120 to identify which user profiles of the second data set are similar to the user profiles of the first data set. It will be appreciated that the second data set may be retrieved and stored from the cloud-based application 120, for example, based on anonymous user profiles, and may not be generated by the client system 130.

At block 320, the cloud-based application 120 may evaluate the set of user features included in the first and second data sets by inputting the set of user features into a feature selection model included in the feature selection system 210. In some cases, the first and second data sets may include the same set of user features, and in other cases, the first and second data sets may include user features at least partially different from each other. The feature selection model of the feature selection system 210 may execute a predictive feature selection technique that detects one or more user features of the set of user features that correlate with the performance of the target outcome. To illustrate and as a non-limiting example, the feature selection model may be used to evaluate the set of user features to predict which features contributed to a user performing the target outcome.

At block 330, the target user profiles may be accessed by the cloud-based application 120. The target user profiles may be the user profiles included in the first data set. For example, the user profiles of the first data set may be retrieved from the user profile database 200. At block 340, the cloud-based application 120 may perform a clustering operation on the user profiles of the second data set. The clustering operation may cause the formation of one or more clusters of user profiles. The clustering operation may be based on the result of the predictive feature selection techniques performed on the set of user features. In each of blocks 330 and 340, the user profiles may also be standardized using one or more feature compression or decomposition techniques (e.g., SVD or NMF). For example, standardizing the user profiles may transform the user features of each user profile in both the first and second data sets into an N-dimensional feature representation of the user profile. It will be appreciated that, in some implementations, the target user profiles (e.g., the first data set) may also be clustered.

At block 350, the cloud-based application 120 may generate a target vector to represent the user profiles included in the first data set. In some implementations, standardizing the user features, as described above, may generate a plurality of numerical values that represent the user profile of a cluster based on the values of the user features included in the user profile. The plurality of numerical values can be aggregated and combined (e.g., averaged) by the cloud-based application 120 to generate a single vector to represent the cluster of user profiles. The plurality of numerical values of the first data set may be aggregated and combined (e.g., averaged) to generate the vector representing the first data set.

At block 360, the cloud-based application 120 may compare each vector of a cluster with the vector representing the first data set. The comparison may be performed using a Euclidean or cosine space, for example. If a distance between the vector representing the cluster and the vector representing the first data set is below a threshold in, for example, the Euclidean or cosine space, then the cloud-based application 120 may determine that the cluster of users is similar to the user profiles of the first data set. Advantageously, the vector-to-vector comparison performed efficiently compares two groups of user profiles together, which reduces processing burdens as compared to comparing on a user-to-user level.

At block 370, a new data set including one or more clusters of user profiles for which the vector is within a threshold distance of the vector representing the first data set may be transmitted from the cloud-based application 120 to the client system 130. In some implementations, when the client system 130 originally requests that the first data set and the second data set be compared for similar user profiles, the request may include a number of user profiles that the client wants to receive. If the number of user profiles in the cluster that is determined to be most similar to the first data set (e.g., the vectors are the closest in a cosine space) is lower than the total number of user profiles requested, then the cloud-based application 120 may identify the next most similar cluster to the first data set (e.g., the cluster for which the vector is next closest to the vector of the first data set in a cosine space) and include the user profiles of that cluster in the new data set, and so on until the total number of user profiles requested is reached.

Figure 4:
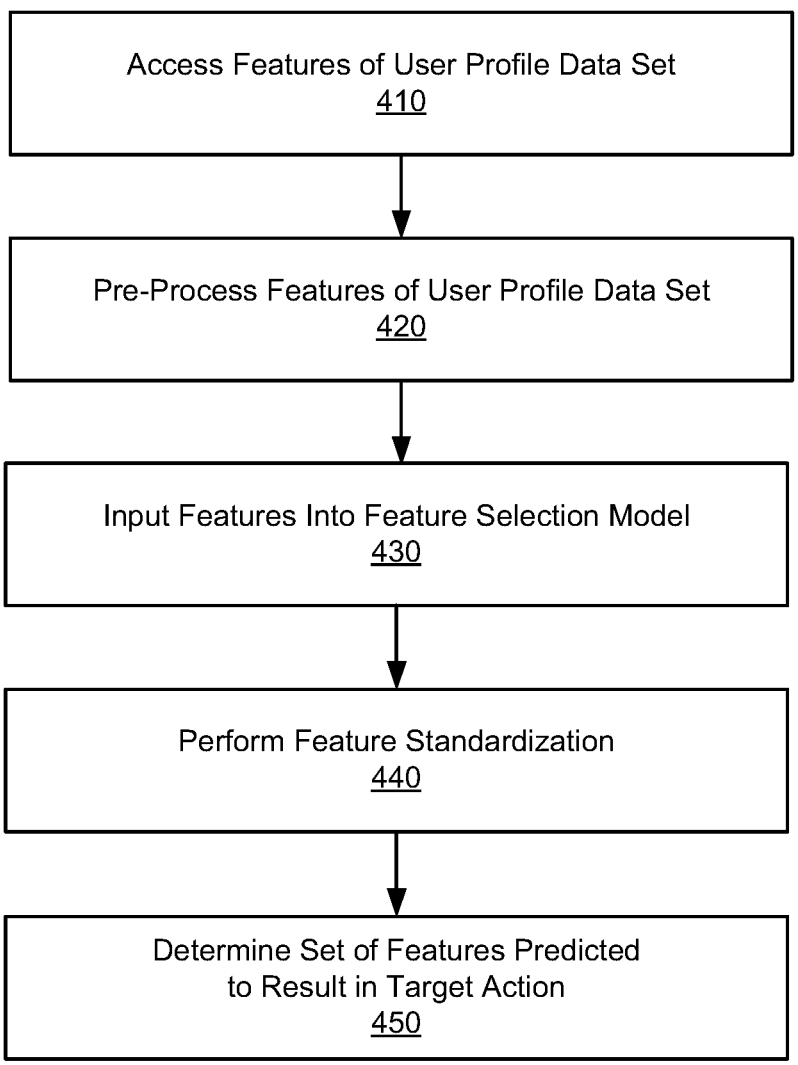
FIG. 4 is a flowchart illustrating another example of a process for determining similar user profiles across multiple data sets, according to some aspects of the present disclosure.

FIG. 4 is a flowchart illustrating another example of a process 400 for determining similar user profiles across multiple data sets, according to some aspects of the present disclosure. Process 400 may be performed by one or more of the hardware-based components described herein, for example, the feature selection system 210 of the cloud-based application 120. Process 400 may be performed to automatically detect a subset of user features from a set of user features included in user profiles of the first and second data set. The cloud-based application 120 may not have previously received the set of user features from the client system 130 in advance to interacting with the client system 130. Thus, as a technical advantage, the feature selection system 210 of the cloud-based application 120 may automatically predict which subset of user features of the set of user features contributed to the performance of the target outcome, regardless of the configuration of user features in the set of user features.

Process 400 begins at block 410 where the feature selection system 210, for example, accesses the set of user features of the user profile data set. For example, the user profile data set may include the first data set of user profiles (e.g., the seed list of user profiles) and/or the second data set (e.g., the candidate list of user profiles). The user profile data set may be stored at user profile database 200 and may have been originally received from the client system 130.

At block 420, the feature selection system 210 may pre-process the set of user features. In some implementations, pre-processing the set of user features may include one or more actions. For example, pre-processing the set of user features may include evaluating the values of each user feature across the plurality of user profiles to calculate a variance of the values. If the variance of the values is above a threshold value (e.g., above 90%), then the user feature may be removed or filtered from the set of user features as likely being a data field of an identifier value, such as a user email address or other user identifier. Further, the pre-processing may include evaluating the values of each user feature across the plurality of user profiles to determine whether the variance of the values is at or below a threshold (e.g., 0%), which indicates that the values do not change across the plurality of user profiles. In this case, the user feature for which the variance is at or below the threshold may be removed from the set of user features.

At block 430, each user feature of the remaining user features from block 420 may be inputted into a feature selection model. For example, the feature selection system 210 may store a feature selection model that performs a predictive feature selection technique on the remaining user features from block 420. As an illustrative and non-limiting example, performing the predictive feature selection technique may include inputting the remaining features from block 420 into a random forest model or a variable importance model, in which the target outcome is identified. The output of the random forest model or the variable importance model may be one or more user features that are predictive of a user performing the target outcome.

At block 440, the cloud-based application 120 may perform a feature standardization protocol on the one or more user features determined at block 430. Performing the feature standardization protocol may include executing one or more feature compression or decomposition techniques on each of the first data set and the second data set. Non-limiting examples of the feature compression or decomposition techniques may include singular value decomposition (SVD), non-negative matrix factorization (NMF), and other suitable feature compression or decomposition techniques. The result of performing the feature standardization protocol may be to generate an N-dimensional feature representation for each user profile. As an illustrative example, performing the feature standardization protocol may standardize the one or more user features of block 430 into three or four dimension numeric features. At block 450, the cloud-based application 120 may store the N-dimensional feature representation of each user feature of the one or more user features outputted by the feature selection model at block 430. The one or more user features stored at block 450 may be used as the basis of clustering the user profiles, as described with respect to FIG. 3 at block 340.

Figure 5:
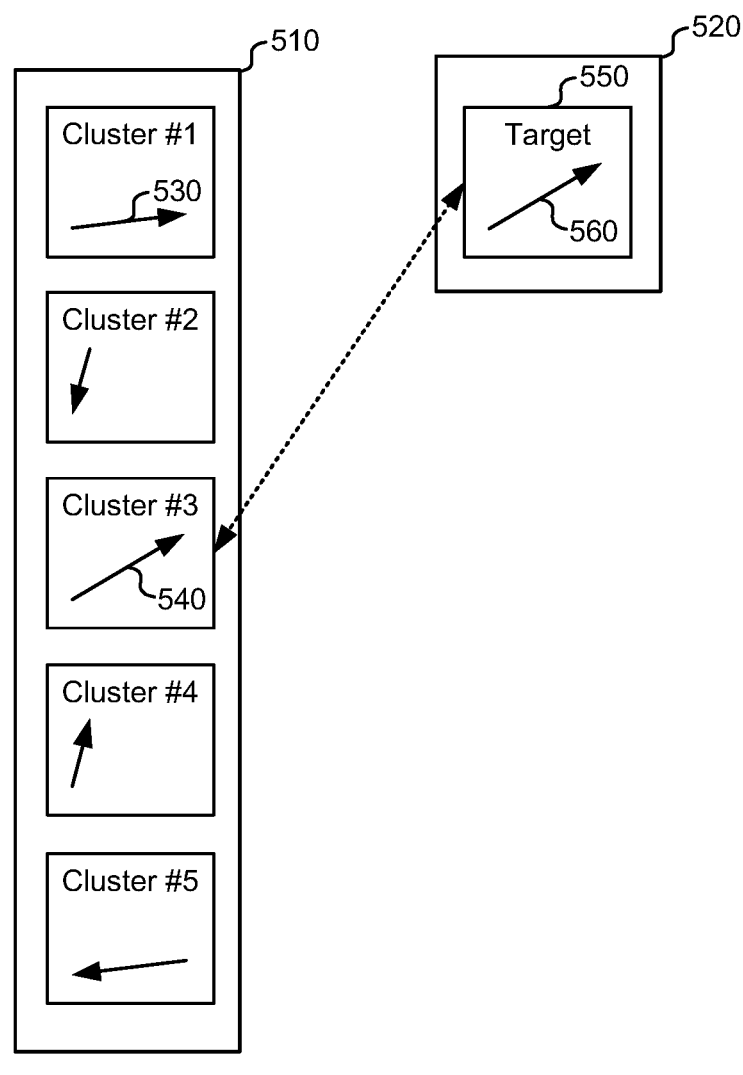
FIG. 5 is a diagram illustrating an example evaluating cluster vectors, according to some aspects of the present disclosure.

FIG. 5 is a diagram illustrating an example of a process 500 for evaluating cluster vectors, according to some aspects of the present disclosure. In some implementations, process 500 may be performed by the similarity detection system 230 of the cloud-based application 120, however, the present disclosure is not limited thereto. As an illustrative example, clusters 510 may be the clusters formed after performing the clustering operation at block 340 of FIG. 3. Clusters 510 may include cluster #1, cluster #2, cluster #3, cluster #4, and cluster #5. A vector may be generated, as described above, to represent each cluster of clusters 510 and the first data set 520. The first data set 520 may be represented by target user profiles 550. For example, vector 530 may represent cluster #1, vector 540 may represent cluster #3, and vector 560 may represent the target user profiles 550 of the first data set 520.

The similarity detection system 230 of the cloud-based application 120, for example, may compare the vector of each cluster (e.g., vectors 530 and 540) to the vector representing the first data set (e.g., vector 560) in a space, such as a Euclidean space or a cosine space. If, for example and as illustrated in FIG. 5, vector 540 is determined to be the closest vector to vector 560 representing the first data set 520 in a vector space, then the cloud-based application 120 may determine that cluster #3 includes user profiles that are similar to the target user profiles 550 of the first data set 520. As a technical advantage, the computational efficiency of the processors or servers of the cloud-based application 120 is improved because, instead of performing user similarity determinations on a user-to-user level, the cloud-based application 120 performs the user similarity determinations on a group-to-group level using a vector-to-vector comparison.

Figure 6:
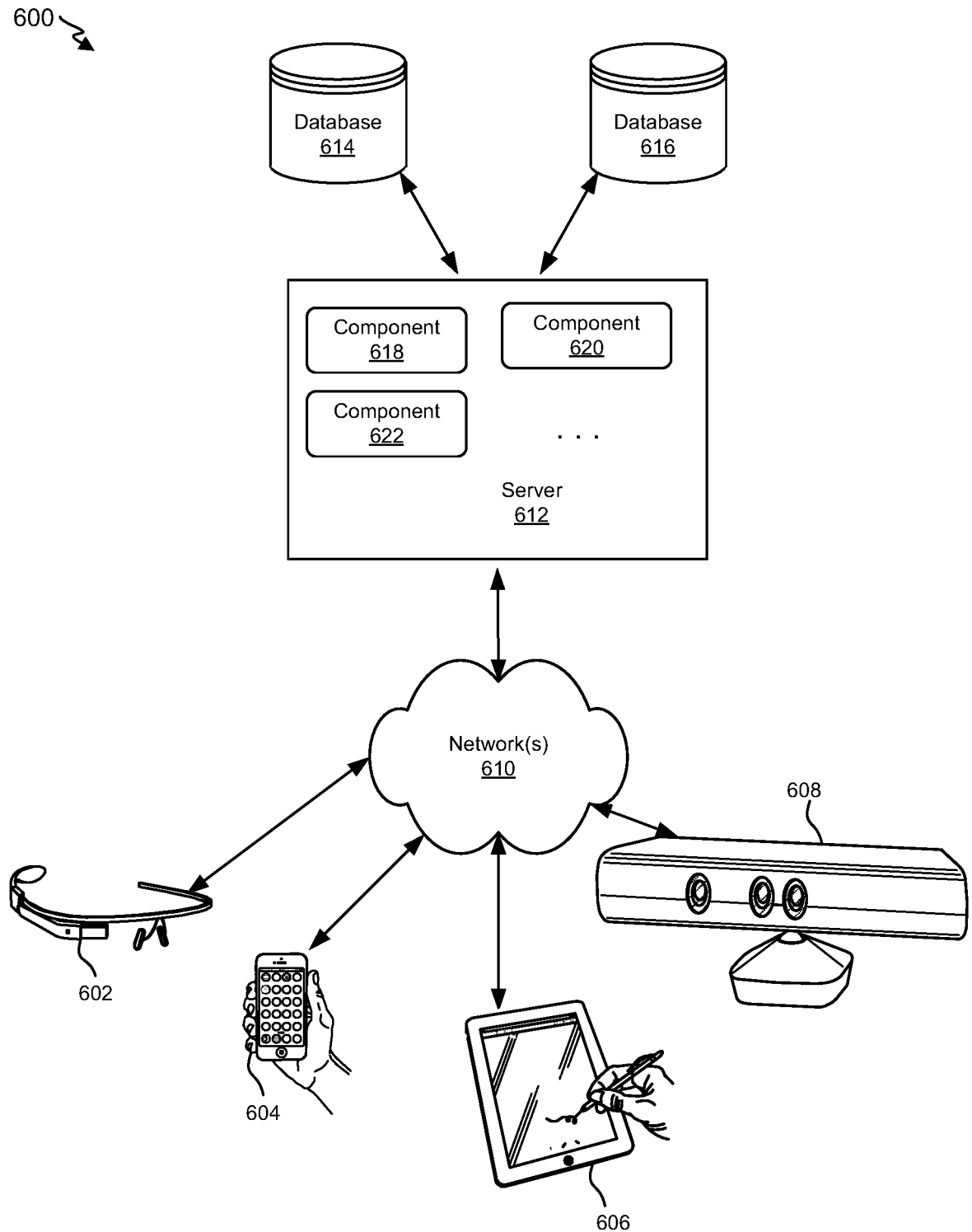
FIG. 6 is a simplified diagram illustrating a distributed system for implementing one of the embodiments.

FIG. 6 depicts a simplified diagram of a distributed system 600 for implementing one of the embodiments. In the illustrated embodiment, distributed system 600 includes one or more client computing devices 602, 604, 606, and 608, which are configured to execute and operate a client application such as a web browser, proprietary client (e.g., Oracle Forms), or the like over one or more network(s) 610. Server 612 may be communicatively coupled with remote client computing devices 602, 604, 606, and 608 via network 610.

In various embodiments, server 612 may be adapted to run one or more services or software applications provided by one or more of the components of the system. In some embodiments, these services may be offered as web-based or cloud services or under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in the figure, the software components 618, 620 and 622 of system 600 are shown as being implemented on server 612. In other embodiments, one or more of the components of system 600 and/or the services provided by these components may also be implemented by one or more of the client computing devices 602, 604, 606, and/or 608. Users operating the client computing devices may then utilize one or more client applications to use the services provided by these components. These components may be implemented in hardware, firmware, software, or combinations thereof. It should be appreciated that various different system configurations are possible, which may be different from distributed system 600. The embodiment shown in the figure is thus one example of a distributed system for implementing an embodiment system and is not intended to be limiting.

Client computing devices 602, 604, 606, and/or 608 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 602, 604, 606, and 608 may be any other electronic device, such as a thin-client computer, an Internet-enabled gaming system (e.g., a Microsoft Xbox gaming console with or without a Kinect® gesture input device), and/or a personal messaging device, capable of communicating over network(s) 610.

Although exemplary distributed system 600 is shown with four client computing devices, any number of client computing devices may be supported. Other devices, such as devices with sensors, etc., may interact with server 612.

Network(s) 610 in distributed system 600 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 610 can be a local area network (LAN), such as one based on Ethernet, Token-Ring and/or the like. Network(s) 610 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 612 may be adapted to run one or more services or software applications described in the foregoing disclosure. For example, server 612 may correspond to a server for performing processing described above according to an embodiment of the present disclosure.

Server 612 may run an operating system including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more databases 614 and 616. Databases 614 and 616 may reside in a variety of locations. By way of example, one or more of databases 614 and 616 may reside on a non-transitory storage medium local to (and/or resident in) server 612. Alternatively, databases 614 and 616 may be remote from server 612 and in communication with server 612 via a network-based or dedicated connection. In one set of embodiments, databases 614 and 616 may reside in a storage-area network (SAN). Similarly, any necessary files for performing the functions attributed to server 612 may be stored locally on server 612 and/or remotely, as appropriate. In one set of embodiments, databases 614 and 616 may include relational databases, such as databases provided by Oracle, that are adapted to store, update, and retrieve data in response to SQL-formatted commands.

Figure 7:
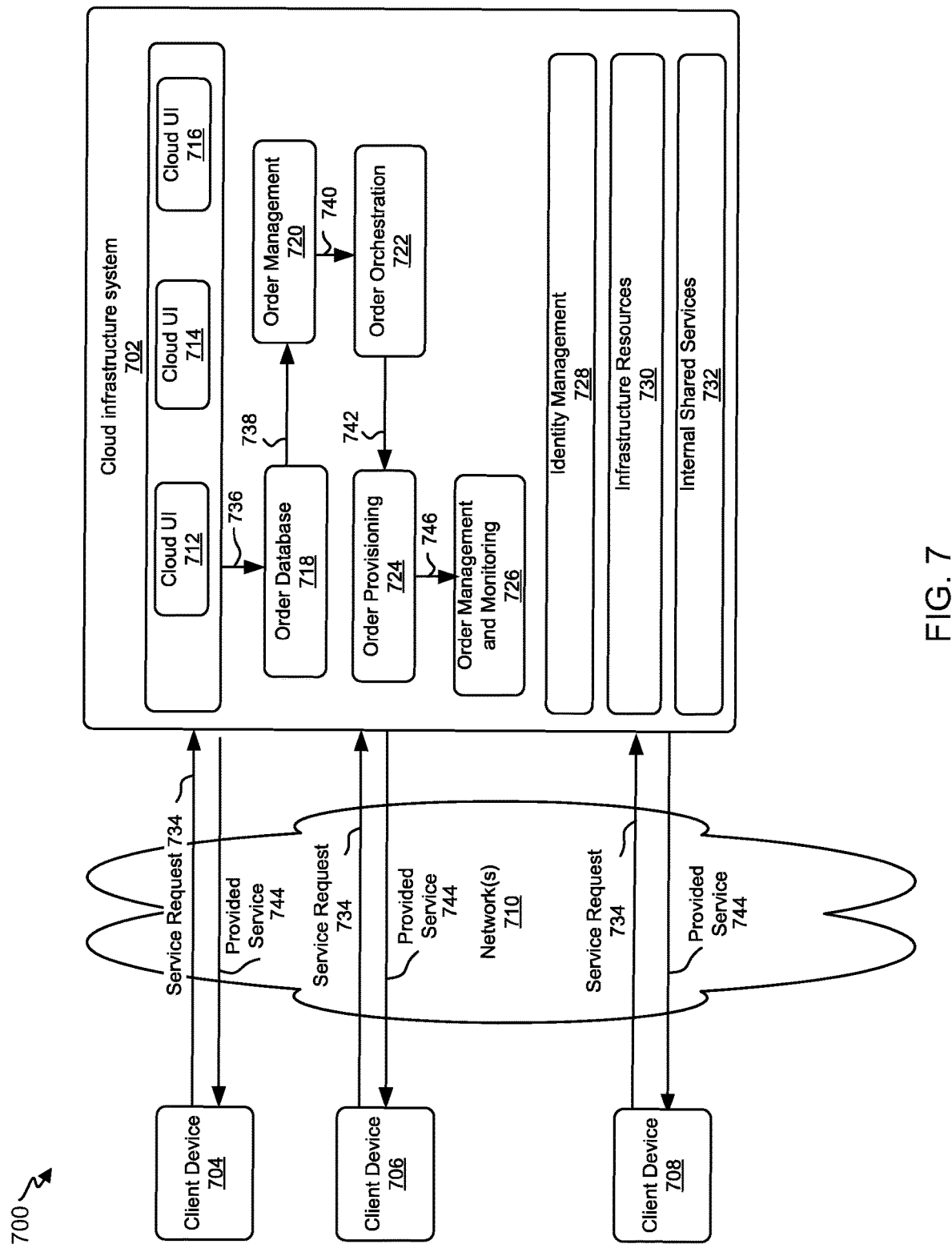
FIG. 7 is a simplified block diagram illustrating one or more components of a system environment.

FIG. 7 is a simplified block diagram of one or more components of a system environment 700 by which services provided by one or more components of an embodiment system may be offered as cloud services, in accordance with an embodiment of the present disclosure. In the illustrated embodiment, system environment 700 includes one or more client computing devices 704, 706, and 708 that may be used by users to interact with a cloud infrastructure system 702 that provides cloud services. The client computing devices may be configured to operate a client application such as a web browser, a proprietary client application (e.g., Oracle Forms), or some other application, which may be used by a user of the client computing device to interact with cloud infrastructure system 702 to use services provided by cloud infrastructure system 702.

It should be appreciated that cloud infrastructure system 702 depicted in the figure may have other components than those depicted. Further, the embodiment shown in the figure is only one example of a cloud infrastructure system that may incorporate an embodiment of the invention. In some other embodiments, cloud infrastructure system 702 may have more or fewer components than shown in the figure, may combine two or more components, or may have a different configuration or arrangement of components.

Client computing devices 704, 706, and 708 may be devices similar to those described above for 602, 604, 606, and 608.

Although exemplary system environment 700 is shown with three client computing devices, any number of client computing devices may be supported. Other devices such as devices with sensors, etc. may interact with cloud infrastructure system 702.

Network(s) 710 may facilitate communications and exchange of data between clients 704, 706, and 708 and cloud infrastructure system 702. Each network may be any type of network familiar to those skilled in the art that can support data communications using any of a variety of commercially-available protocols, including those described above for network(s) 610.

Cloud infrastructure system 702 may comprise one or more computers and/or servers that may include those described above for server 612.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 702 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 702 may be adapted to automatically provision, manage and track a customer's subscription to services offered by cloud infrastructure system 702. Cloud infrastructure system 702 may provide the cloud services via different deployment models. For example, services may be provided under a public cloud model in which cloud infrastructure system 702 is owned by an organization selling cloud services (e.g., owned by Oracle) and the services are made available to the general public or different industry enterprises. As another example, services may be provided under a private cloud model in which cloud infrastructure system 702 is operated solely for a single organization and may provide services for one or more entities within the organization. The cloud services may also be provided under a community cloud model in which cloud infrastructure system 702 and the services provided by cloud infrastructure system 702 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 702. Cloud infrastructure system 702 then performs processing to provide the services in the customer's subscription order.

In some embodiments, the services provided by cloud infrastructure system 702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various cloud applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 702 may also include infrastructure resources 730 for providing the resources used to provide various services to customers of the cloud infrastructure system. In one embodiment, infrastructure resources 730 may include pre-integrated and optimized combinations of hardware, such as servers, storage, and networking resources to execute the services provided by the PaaS platform and the SaaS platform.

In some embodiments, resources in cloud infrastructure system 702 may be shared by multiple users and dynamically re-allocated per demand. Additionally, resources may be allocated to users in different time zones. For example, cloud infrastructure system 730 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 732 may be provided that are shared by different components or modules of cloud infrastructure system 702 and by the services provided by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 702 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 702, and the like.

In one embodiment, as depicted in the figure, cloud management functionality may be provided by one or more modules, such as an order management module 720, an order orchestration module 722, an order provisioning module 724, an order management and monitoring module 726, and an identity management module 728. These modules may include or be provided using one or more computers and/or servers, which may be general purpose computers, specialized server computers, server farms, server clusters, or any other appropriate arrangement and/or combination.

In exemplary operation 734, a customer using a client device, such as client device 704, 706 or 708, may interact with cloud infrastructure system 702 by requesting one or more services provided by cloud infrastructure system 702 and placing an order for a subscription for one or more services offered by cloud infrastructure system 702. In certain embodiments, the customer may access a cloud User Interface (UI), cloud UI 712, cloud UI 714 and/or cloud UI 716 and place a subscription order via these UIs. The order information received by cloud infrastructure system 802 in response to the customer placing an order may include information identifying the customer and one or more services offered by the cloud infrastructure system 702 that the customer intends to subscribe to.

After an order has been placed by the customer, the order information is received via the cloud UIs, 712, 714 and/or 716.

At operation 736, the order is stored in order database 718. Order database 718 can be one of several databases operated by cloud infrastructure system 718 and operated in conjunction with other system elements.

At operation 738, the order information is forwarded to an order management module 720. In some instances, order management module 720 may be configured to perform billing and accounting functions related to the order, such as verifying the order, and upon verification, booking the order.

At operation 740, information regarding the order is communicated to an order orchestration module 722. Order orchestration module 722 may utilize the order information to orchestrate the provisioning of services and resources for the order placed by the customer. In some instances, order orchestration module 722 may orchestrate the provisioning of resources to support the subscribed services using the services of order provisioning module 724.

In certain embodiments, order orchestration module 722 enables the management of processes associated with each order and applies logic to determine whether an order should proceed to provisioning. At operation 742, upon receiving an order for a new subscription, order orchestration module 722 sends a request to order provisioning module 724 to allocate resources and configure those resources needed to fulfill the subscription order. Order provisioning module 724 enables the allocation of resources for the services ordered by the customer. Order provisioning module 724 provides a level of abstraction between the cloud services provided by cloud infrastructure system 700 and the physical implementation layer that is used to provision the resources for providing the requested services. Order orchestration module 722 may thus be isolated from implementation details, such as whether or not services and resources are actually provisioned on the fly or pre-provisioned and only allocated/assigned upon request.

At operation 744, once the services and resources are provisioned, a notification of the provided service may be sent to customers on client devices 704, 706 and/or 708 by order provisioning module 724 of cloud infrastructure system 702.

At operation 746, the customer's subscription order may be managed and tracked by an order management and monitoring module 726. In some instances, order management and monitoring module 726 may be configured to collect usage statistics for the services in the subscription order, such as the amount of storage used, the amount data transferred, the number of users, and the amount of system up time and system down time.

In certain embodiments, cloud infrastructure system 700 may include an identity management module 728. Identity management module 728 may be configured to provide identity services, such as access management and authorization services in cloud infrastructure system 700. In some embodiments, identity management module 728 may control information about customers who wish to utilize the services provided by cloud infrastructure system 702. Such information can include information that authenticates the identities of such customers and information that describes which actions those customers are authorized to perform relative to various system resources (e.g., files, directories, applications, communication ports, memory segments, etc.) Identity management module 728 may also include the management of descriptive information about each customer and about how and by whom that descriptive information can be accessed and modified.

Figure 8:
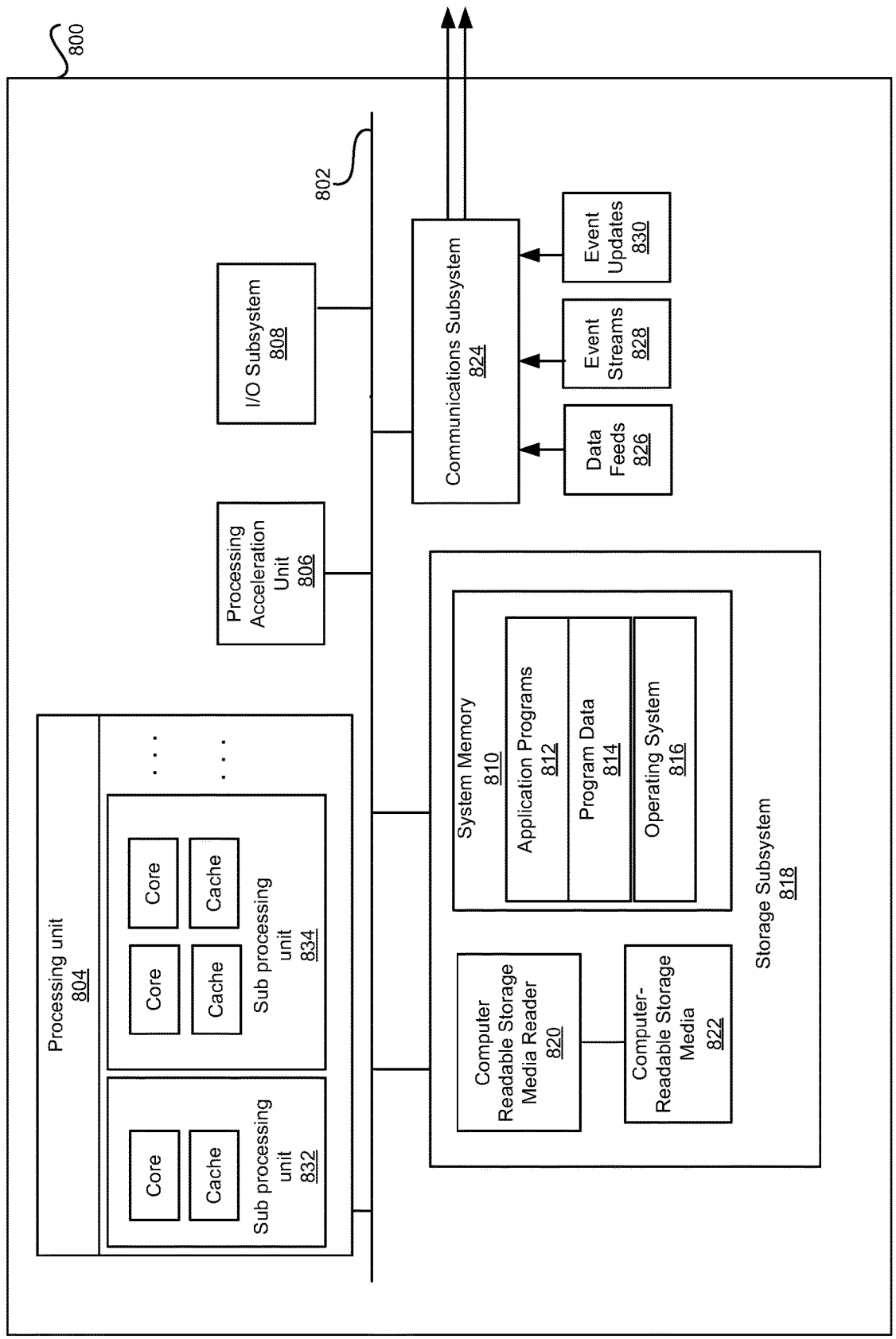
FIG. 8 illustrates an exemplary computer system, in which various embodiments of the present invention may be implemented.

FIG. 8 illustrates an exemplary computer system 800, in which various embodiments of the present invention may be implemented. The system 800 may be used to implement any of the computer systems described above. As shown in the figure, computer system 800 includes a processing unit 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 includes tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 804, which can be implemented as one or more integrated circuits (e.g., a conventional microprocessor or microcontroller), controls the operation of computer system 800. One or more processors may be included in processing unit 804. These processors may include single core or multicore processors. In certain embodiments, processing unit 804 may be implemented as one or more independent processing units 832 and/or 834 with single or multicore processors included in each processing unit. In other embodiments, processing unit 804 may also be implemented as a quad-core processing unit formed by integrating two dual-core processors into a single chip.

In various embodiments, processing unit 804 can execute a variety of programs in response to program code and can maintain multiple concurrently executing programs or processes. At any given time, some or all of the program code to be executed can be resident in processor(s) 804 and/or in storage subsystem 818. Through suitable programming, processor(s) 804 can provide various functionalities described above. Computer system 800 may additionally include a processing acceleration unit 806, which can include a digital signal processor (DSP), a special-purpose processor, and/or the like.

I/O subsystem 808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 800 may comprise a storage subsystem 818 that comprises software elements, shown as being currently located within a system memory 810. System memory 810 may store program instructions that are loadable and executable on processing unit 804, as well as data generated during the execution of these programs.

Depending on the configuration and type of computer system 800, system memory 810 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 804. In some implementations, system memory 810 may include multiple different types of memory, such as static random access memory (SRAM) or dynamic random access memory (DRAM). In some implementations, a basic input/output system (BIOS), containing the basic routines that help to transfer information between elements within computer system 800, such as during start-up, may typically be stored in the ROM. By way of example, and not limitation, system memory 810 also illustrates application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 818 may also provide a tangible computer-readable storage medium for storing the basic programming and data constructs that provide the functionality of some embodiments. Software (programs, code modules, instructions) that when executed by a processor provide the functionality described above may be stored in storage subsystem 818. These software modules or instructions may be executed by processing unit 804. Storage subsystem 818 may also provide a repository for storing data used in accordance with the present invention.

Storage subsystem 800 may also include a computer-readable storage media reader 820 that can further be connected to computer-readable storage media 822.

Together and, optionally, in combination with system memory 810, computer-readable storage media 822 may comprehensively represent remote, local, fixed, and/or removable storage devices plus storage media for temporarily and/or more permanently containing, storing, transmitting, and retrieving computer-readable information.

Computer-readable storage media 822 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 800.

By way of example, computer-readable storage media 822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 800.

Communications subsystem 824 provides an interface to other computer systems and networks. Communications subsystem 824 serves as an interface for receiving data from and transmitting data to other systems from computer system 800. For example, communications subsystem 924 may enable computer system 800 to connect to one or more devices via the Internet. In some embodiments communications subsystem 824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1202.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

In some embodiments, communications subsystem 824 may also receive input communication in the form of structured and/or unstructured data feeds 826, event streams 828, event updates 830, and the like on behalf of one or more users who may use computer system 800.

By way of example, communications subsystem 824 may be configured to receive data feeds 826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 824 may also be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:
receiving a communication corresponding to a request for additional user profiles;
in response to receiving the communication, accessing a user data set representing a plurality of user profiles, each user profile of the plurality of user profiles including a set of features characterizing a user associated with the user profile;
accessing a target data set including one or more target user profiles, each target user profile of the one or more target users profile having been previously identified by a client system as a target for engagement, and each target user profile of the one or more target user profiles being characterized by the set of features;

inputting each of the target data set and the user data set into a feature selection model, the feature selection model having been trained to select a subset of the set of features that are predictive of resulting in a target outcome;

performing a clustering operation on the user data set, the clustering operation causing one or more clusters of user profiles to be formed from the plurality of user profiles, and each cluster of the one or more clusters including two or more user profiles that share one or more features in common from the subset of features identified using the feature selection model;

generating, for each cluster of the one or more clusters, a cluster vector representing the one or more user profiles included in the cluster;

generating a target vector representing the one or more target user profiles included in the target data set;

determining a vector-to-vector similarity between the target vector and each cluster vector of the one or more cluster vectors;

selecting a cluster vector from the one or more cluster vectors, the selection being based at least in part on the vector-to-vector similarity between the target vector and the selected cluster vector; and in response to selecting the cluster vector, generating a response to the communication including each user profile of the one or more user profiles included in the selected cluster, the response indicating that the one or more user profiles included in the selected cluster are similar to the one or more target user profiles.

2. The computer-implemented method of claim 1, further comprising:

preprocessing the user data set by filtering the set of features, the filtering including removing a feature from the set of features when the feature is associated with a plurality of values across multiple user profiles, and wherein a variance of the plurality of values is greater than or equal to a threshold.

3. The computer-implemented method of claim 1, further comprising:

preprocessing the user data set by filtering the set of features, the filtering including removing a feature from the set of features when the feature is associated with a plurality of values across multiple user profiles, and wherein a variance of the plurality of values is less than a threshold.

4. The computer-implemented method of claim 1, wherein the feature selection model uses one or more unsupervised machine-learning techniques to identify the subset of features from the set of features, the set of features being unknown prior to accessing the user data set.

5. The computer-implemented method of claim 1, further comprising:

transforming the user data set into numerical form using one or more feature decomposition techniques, wherein the transformed user data set includes an N-dimensional matrix representing each user of the plurality of users, each data element of the N-dimensional matrix corresponding to a feature of the set of features.

6. The computer-implemented method of claim 1, wherein determining the vector-to-vector similarity between the target vector and each cluster vector of the one or more cluster vectors includes determining a similarity measure between the target vector and each cluster vector.

7. The computer-implemented method of claim 1, wherein the communication further includes a requested number of user profiles that are determined to be similar to the one or more target user profiles, and wherein when the requested number of user profiles is larger than a number of user profiles included in the selected cluster, a user profile from another cluster is selected for inclusion in the response to the request for additional user profiles.

8. A system, comprising:

one or more data processors; and a non-transitory computer-readable storage medium containing instructions which, when executed on the one or more data processors, cause the one or more data processors to perform operations including:

receiving a communication corresponding to a request for additional user profiles;

in response to receiving the communication, accessing a user data set representing a plurality of user profiles, each user profile of the plurality of user profiles including a set of features characterizing a user associated with the user profile;

accessing a target data set including one or more target user profiles, each target user profile of the one or more target users profile having been previously identified by a client system as a target for engagement, and each target user profile of the one or more target user profiles being characterized by the set of features;

inputting each of the target data set and the user data set into a feature selection model, the feature selection model having been trained to select a subset of the set of features that are predictive of resulting in a target outcome;

performing a clustering operation on the user data set, the clustering operation causing one or more clusters of user profiles to be formed from the plurality of user profiles, and each cluster of the one or more clusters including two or more user profiles that share one or more features in common from the subset of features identified using the feature selection model;

generating, for each cluster of the one or more clusters, a cluster vector representing the one or more user profiles included in the cluster;

generating a target vector representing the one or more target user profiles included in the target data set;

determining a vector-to-vector similarity between the target vector and each cluster vector of the one or more cluster vectors;

selecting a cluster vector from the one or more cluster vectors, the selection being based at least in part on the vector-to-vector similarity between the target vector and the selected cluster vector; and in response to selecting the cluster vector, generating a response to the communication including each user profile of the one or more user profiles included in the selected cluster, the response indicating that the one or more user profiles included in the selected cluster are similar to the one or more target user profiles.

9. The system of claim 8, wherein the operations further comprise:

preprocessing the user data set by filtering the set of features, the filtering including removing a feature from the set of features when the feature is associated with a plurality of values across multiple user profiles, and wherein a variance of the plurality of values is greater than or equal to a threshold.

10. The system of claim 8, wherein the operations further comprise:
preprocessing the user data set by filtering the set of features, the filtering including removing a feature from the set of features when the feature is associated with a plurality of values across multiple user profiles, and wherein a variance of the plurality of values is less than a threshold.

11. The system of claim 8, wherein the feature selection model uses one or more unsupervised machine-learning techniques to identify the subset of features from the set of features, the set of features being unknown prior to accessing the user data set.

12. The system of claim 8, wherein the operations further comprise:
transforming the user data set into numerical form using one or more feature decomposition techniques, wherein the transformed user data set includes an N-dimensional matrix representing each user of the plurality of users, each data element of the N-dimensional matrix corresponding to a feature of the set of features.

13. The system of claim 8, wherein determining the vector-to-vector similarity between the target vector and each cluster vector of the one or more cluster vectors includes determining a similarity measure between the target vector and each cluster vector.

14. The system of claim 8, wherein the communication further includes a requested number of user profiles that are determined to be similar to the one or more target user profiles, and wherein when the requested number of user profiles is larger than a number of user profiles included in the selected cluster, a user profile from another cluster is selected for inclusion in the response to the request for additional user profiles.

15. A computer-program product tangibly embodied in a non-transitory machine-readable storage medium, including instructions configured to cause a data processing apparatus to perform operations including:
receiving a communication corresponding to a request for additional user profiles;
in response to receiving the communication, accessing a user data set representing a plurality of user profiles, each user profile of the plurality of user profiles including a set of features characterizing a user associated with the user profile;
accessing a target data set including one or more target user profiles, each target user profile of the one or more target users profile having been previously identified by a client system as a target for engagement, and each target user profile of the one or more target user profiles being characterized by the set of features;
inputting each of the target data set and the user data set into a feature selection model, the feature selection model having been trained to select a subset of the set of features that are predictive of resulting in a target outcome;
performing a clustering operation on the user data set, the clustering operation causing one or more clusters of user profiles to be formed from the plurality of user profiles, and each cluster of the one or more clusters including two or more user profiles that share one or more features in common from the subset of features identified using the feature selection model;
generating, for each cluster of the one or more clusters, a cluster vector representing the one or more user profiles included in the cluster;
generating a target vector representing the one or more target user profiles included in the target data set;
determining a vector-to-vector similarity between the target vector and each cluster vector of the one or more cluster vectors;
selecting a cluster vector from the one or more cluster vectors, the selection being based at least in part on the vector-to-vector similarity between the target vector and the selected cluster vector; and
in response to selecting the cluster vector, generating a response to the communication including each user profile of the one or more user profiles included in the selected cluster, the response indicating that the one or more user profiles included in the selected cluster are similar to the one or more target user profiles.

16. The non-transitory machine-readable storage medium of claim 15, wherein the operations further comprise:
preprocessing the user data set by filtering the set of features, the filtering including removing a feature from the set of features when the feature is associated with a plurality of values across multiple user profiles, and wherein a variance of the plurality of values is greater than or equal to a threshold.

17. The non-transitory machine-readable storage medium of claim 15, wherein the operations further comprise:
preprocessing the user data set by filtering the set of features, the filtering including removing a feature from the set of features when the feature is associated with a plurality of values across multiple user profiles, and wherein a variance of the plurality of values is less than a threshold.

18. The non-transitory machine-readable storage medium of claim 15, wherein the feature selection model uses one or more unsupervised machine-learning techniques to identify the subset of features from the set of features, the set of features being unknown prior to accessing the user data set.

19. The non-transitory machine-readable storage medium of claim 15, wherein the operations further comprise:
transforming the user data set into numerical form using one or more feature decomposition techniques, wherein the transformed user data set includes an N-dimensional matrix representing each user of the plurality of users, each data element of the N-dimensional matrix corresponding to a feature of the set of features.

20. The non-transitory machine-readable storage medium of claim 15, wherein determining the vector-to-vector similarity between the target vector and each cluster vector of the one or more cluster vectors includes determining a similarity measure between the target vector and each cluster vector.

\* \* \* \* \*